(12) United States Patent
Xu

(10) Patent No.: US 9,069,162 B2
(45) Date of Patent: Jun. 30, 2015

(54) LIGHTING DEVICE, METHOD AND LIGHT WAVELENGTH CONVERSION WHEEL ASSEMBLY FOR COLOR TUNING THEREOF

(75) Inventor: Yanzheng Xu, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 206 days.

(21) Appl. No.: 13/510,510

(22) PCT Filed: Nov. 19, 2010

(86) PCT No.: PCT/CN2010/001856
§ 371 (c)(1),
(2), (4) Date: May 17, 2012

(87) PCT Pub. No.: WO2011/060619
PCT Pub. Date: May 26, 2011

(65) Prior Publication Data
US 2012/0230013 A1    Sep. 13, 2012

(30) Foreign Application Priority Data
Nov. 19, 2009    (CN) .......................... 2009 1 0189519

(51) Int. Cl.
*F21V 9/08*    (2006.01)
*G02B 26/00*    (2006.01)
(Continued)

(52) U.S. Cl.
CPC ........ *G02B 26/008* (2013.01); *F21W 2131/406* (2013.01); *G02B 7/006* (2013.01); *G02B 27/1053* (2013.01); *G02B 27/149* (2013.01); *G03B 21/204* (2013.01)

(58) Field of Classification Search
CPC ............... F21K 9/50–9/58; F21S 10/00; F21S 10/02–10/066; G02B 26/007–26/008
USPC .................................................. 362/231, 232
See application file for complete search history.

(56) References Cited

U.S. PATENT DOCUMENTS

2004/0095767 A1*    5/2004    Ohmae et al. ................. 362/293
2007/0019408 A1*    1/2007    McGuire et al. .............. 362/231
(Continued)

FOREIGN PATENT DOCUMENTS

CN    101498401    8/2009
CN    101498416    8/2009
(Continued)

OTHER PUBLICATIONS

International Search Report in the parent PCT application No. PCT/CN2010/001856, dated Mar. 3, 2011.
(Continued)

*Primary Examiner* — Karabi Guharay
*Assistant Examiner* — Nathaniel Lee
(74) *Attorney, Agent, or Firm* — Chen Yoshimura LLP

(57) ABSTRACT

A lighting device, a method and a light wavelength conversion wheel assembly for color tuning thereof. The lighting device includes a light source which includes an excitation light source and a moving unit. The moving unit includes a light wavelength conversion wheel assembly having a heat dissipation base. The heat dissipation base is divided into a number of segments carrying different wavelength conversion materials, and is controlled to rotate intermittently or rotate to a predetermined angle around a wheel shaft serving as an axis. The heat dissipation base faces the exciting light and is illuminated locally. A control unit controls the rotation so that a predetermined area is rotated into the illumination area of the exciting light. Output light of a predetermined color is provided by the excitation light source and the predetermined area or the wavelength conversion material located in the predetermined area.

23 Claims, 3 Drawing Sheets

(51) Int. Cl.
*G02B 7/00* (2006.01)
*G02B 27/10* (2006.01)
*G02B 27/14* (2006.01)
*G03B 21/20* (2006.01)
*F21V 9/00* (2006.01)
*F21W 131/406* (2006.01)

(56) References Cited

U.S. PATENT DOCUMENTS

2009/0002992 A1* 1/2009 Dallas et al. .................. 362/280
2009/0103293 A1* 4/2009 Harbers et al. ................ 362/231
2009/0284148 A1 11/2009 Iwanaga

FOREIGN PATENT DOCUMENTS

| CN | 101581410 | 11/2009 |
| JP | 2008052070 | 3/2008 |
| WO | 2009017992 | 2/2009 |
| WO | WO 2009017992 A1 * | 2/2009 |
| WO | 2009052099 | 4/2009 |

OTHER PUBLICATIONS

IPRP in the parent PCT application No. PCT/CN2010/001856, dated May 22, 2012.
Chinese Office Action, dated Oct. 31, 2012, in a counterpart Chinese patent application, No. CN 200910189519.8.

* cited by examiner

LIGHTING DEVICE, METHOD AND LIGHT WAVELENGTH CONVERSION WHEEL ASSEMBLY FOR COLOR TUNING THEREOF

BACKGROUND OF THE INVENTION

1. Field of the Invention

This invention relates to lighting devices and light sources, and in particular, it relates to control and tuning techniques for light sources, and tuning of the output light color.

2. Description of the Related Art

Currently, light sources for high power stage lighting devices primarily use metal halide discharge lamps. Metal halide discharge lamps are which light sources, and their life is relatively short, from a few hundred to a few thousand hours. Because the emission spectrum of metal halide discharge lamps is a white continuous spectrum, output lights of different colors can only be obtained by using color filters. The color patterns projected by such lighting devices have relatively low color saturation; the color is neither vivid nor rich.

To increase the color saturation of monochromatic output light, conventional stage lighting devices sometimes use very narrow band color filters. Although the color saturation is increased, the brightness of the output monochromatic light is reduced.

With the development of solid state light source technologies, solid state light sources, in particular light emitting diodes (LED), are becoming more widely used in state lighting systems. But because of the limitations in heat dissipation and light flux of LED lights, currently, LED light sources are mainly used in low-end low power color changing light products.

To use solid state light sources in high power stage lighting devices, a device described in a patent application previously filed by the same applicant (see FIG. 1) utilizes multiple high power LED arrays to provide red (R), green (G) and blue (B) lights separately, and utilizes light combining devices such as an X-shaped light combiner 15 to combined the lights and obtain output lights of desired colors.

In addition, current light source devices use a single light source in combination with phosphor materials to generate output light of various colors. For example, Chinese patent application No. 2008100653661 describes a device which employs a moving unit disposed on the optical path of a light source, the moving unit carrying multiple phosphor materials and rotating at a high speed, to generate an output light which is a mixture of multiple monochromatic lights. This device can also control and adjust the output power of the light source in real time to achieve desired color variation of the combined output light.

A shortcoming of the above technology is that, in the abovementioned technology by the same applicant, although the high power stage lighting device can achieve high brightness and high saturation monochromatic light, the color rendering capability of the white light is still insufficient. The reason is as follows. Conventional metal halide discharge lamps are hot light sources whose light emitting efficiency is not affected by the output power. For example, a 575 W lamp, whether its output flux is 49000 lumen or 110000 lumen, the light emitting efficiency is 85 lumen/W for metal halide discharge lamps. To the contrary, the light emitting efficiency of current high power LED decreases with increased drive power. Moreover, in current R, G, B base color LEDs, green LEDs have the lowest light emitting efficiency and blue LEDs have the highest light emitting efficiency. However, because the white spectrum contains the most green component and the least blue component, to obtain adequate white balance, the brightness of the white LED stage lighting device will be low. In particular, a stage light requires a low color temperature light (e.g. 3200K) in sometimes applications, which requires even more green light components, resulting in even lower brightness of the white light. Further, the above described light source uses large arrays of high power LEDs, which increases the cost of the light source compared to conventional devices and limits its applicability.

Although the light source device described in the above mentioned Chinese patent application No. 2008100653661 can provide rich color variation, it requires high rotation speed of the moving unit to achieve desired color adjustment, which imposes high requirement on the real time control of the light source.

SUMMARY OF THE INVENTION

To solve various problems of current technology, the present invention is directed to a lighting device and related color tuning methods which can be achieved with low cost. The lighting device can provide pattern projection with relatively high efficiency of white color light generation.

To achieve these advantages, the present invention uses a heat dissipating moving unit which defines different segments carrying different wavelength conversion materials; based on the requirement for different color output light, such as required color light for projecting onto a stage, the moving unit is moved so that different segments are illuminated by an excitation light, to generate output light of desired colors. This system can meet the color requirements of state lighting and provide a low cost, high brightness or high saturation light.

The present invention provides a wavelength conversion wheel assembly, which includes: a heat dissipating base having a plurality of segments, each segment carrying a wavelength conversion material or no wavelength conversion material; and a mounting device for supporting the heat dissipating base to rotate around a rotation axis, wherein the heat dissipating base is controlled to rotate intermittently or to predetermined angles.

In the above device, the plurality of segments have substantially identical sizes, have a circular shape, and are distributed in a circular manner on the heat dissipating base. The heat dissipating base has a plate shape or a cylindrical shape. The wavelength conversion materials include phosphor, dye or quantum dots. The wavelength conversion materials are coated on the heat dissipating base, filled into the heat dissipating base, or adhered to the heat dissipating base.

In the above device, the heat dissipating base is made of a transparent material. The heat dissipating base includes two heat conductive glass plates clamped together, and the wavelength conversion materials are sandwiched between the two heat conductive glass plates. At least one of segments of the heat dissipating base further includes a filter film or filter plate. The heat dissipating base includes a heat dissipating plate having a plurality of through holes, where each segment is disposed in a through hole, each segment including a transparent heat conducting plate disposed in the through holes for carrying the wavelength conversion material. The wavelength conversion wheel assembly further includes a gear disposed on a rotating shaft of the heat dissipating base or at an edge of the heat dissipating base.

In another aspect, the present invention provides a lighting device, which includes: a light source; a light output port; a light guiding device for guiding the light from the light source to the light output port; wherein the light source includes: an excitation light source for providing an excitation light; and a moving unit, wherein the moving unit includes the wavelength conversion wheel assembly described above, wherein the heat dissipating base faces the excitation light and is partially illuminated by the excitation light, wherein an area of illumination is no greater than an area of any one of the segments; and a control unit for controlling a movement of the wavelength conversion wheel assembly so that a selected one of the plurality of segments of the heat dissipating base is illuminated by the excitation light to generate an output light.

In the above device, the excitation light source includes an array of a plurality of light emitting diodes (LED), and the lighting device further comprises an array of a plurality of collimating lenses, each collimating lens being aligned with an LED to collimate a light emitted by the LED into near parallel light. The light guiding device includes a focusing lens for focusing the light from the light source to the light output port. The lighting device further includes: a filter plate having a size similar to a size of the plurality of segments of the heat dissipating base; and a second wheel carrying the filter plate; wherein the control unit controls a movement of second wheel to move the filter plate in and out of an optical path between the heat dissipating base and the light guiding device. The heat dissipating base of the wavelength conversion wheel assembly includes at least one segment that carries a wavelength conversion material, the heat dissipating base further comprising a wavelength selection filter film or filter plate disposed in the at least one segment on a side facing the excitation light.

More specifically, the lighting device may further include a second focusing lens for focusing the excitation light onto the wavelength conversion material on the heat dissipating base. It may further include a second collimating lens disposed between the heat dissipating base and the focusing lens for collimating the light from the light source into a near parallel light to be focused by the focusing lens. It may further include an integral lens set disposed between the second collimating lens and the focusing lens. It may further include a pattern wheel carrying pattern plates aligned with the light output port.

In another aspect, the present invention provides a color tuning method for a lighting device, wherein the lighting device comprises a light source, a light output port, and a light guiding device for guiding the light from the light source to the output port, wherein the light source includes an excitation light source for providing an excitation light, the method including:

Providing a moving unit, wherein the moving unit includes the wavelength conversion wheel assembly of any one of claims 1-10, wherein the heat dissipating base faces the excitation light and is partially illuminated by the excitation light, wherein an area of illumination is no greater than an area of any one of the segments;

Operating a control unit to control the wavelength conversion wheel assembly, wherein the wavelength conversion wheel assembly moves so that a selected one of the plurality of segments is disposed in an illumination path of the excitation light; and Generating an output light of a selected color, wherein the color of the output light is determined by the excitation light source and the selected segment or the wavelength conversion material carried by the selected segment.

In the above method, the excitation light source includes an array of a plurality of light emitting diodes (LED) and an array of a plurality of collimating lenses, each collimating lens being aligned with an LED to collimate a light emitted by the LED into near parallel light. The LEDs are blue LEDs.

In the above method, the heat dissipating base is made of a transparent material or have a plurality of through holes in which the segments are disposed, and the method further includes: providing a filter plate or filter film on or near the heat dissipating base on a side facing the light guiding device, wherein the filter plate or filter film is disposed in an optical path between the heat dissipating base and the light guiding device for selectively transmitting light of a predetermined wavelength range or predetermined output angle range. The method further includes: coating or disposing a wavelength selection filter film or filter plate on the heat dissipating base on a side facing the excitation light for reflecting the converted light.

In the above method, the operating step includes operating the control unit at predetermined times or intermittently according to a predetermined color changing pattern to select the segments or filter plates. The method further includes: the control unit controlling the excitation light and the moving unit in a synchronized manner. The control unit includes a stepping motor for driving the wavelength conversion wheel assembly via gears.

Embodiments of the present invention provide a stage lighting device and color tuning method that are easy to implement and easy to control, and can be achieved at low cost.

The reference symbols in the figures represent: 1—LED array, 2—collimating lens array, 3—second focusing lens, 4—moving unit/wavelength conversion wheel assembly, 5—second collimating lens, 6—integral lens, 7—focusing lens, 8—light output port, 40—heat dissipating base, 41—areas carrying wavelength conversion materials, 42—areas free of wavelength conversion materials, 43—rotating shaft, 44—gear, 45—filter, 46—wavelength conversion material, 47—heat conducting plate.

DETAILED DESCRIPTION OF THE PREFERRED EMBODIMENTS

Preferred embodiments of the present invention are described below with reference to the drawings.

Figure 1:
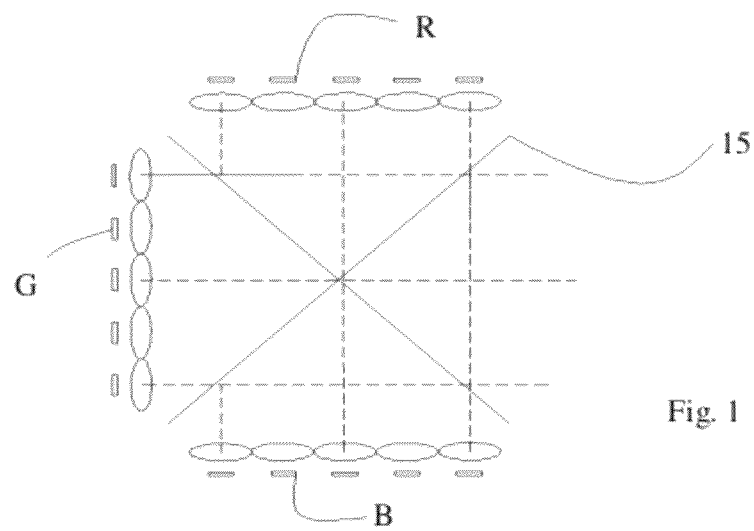
FIG. 1 illustrates the structure of a conventional stage lighting device having a light combiner to provide output light of various colors.
Figure 2:
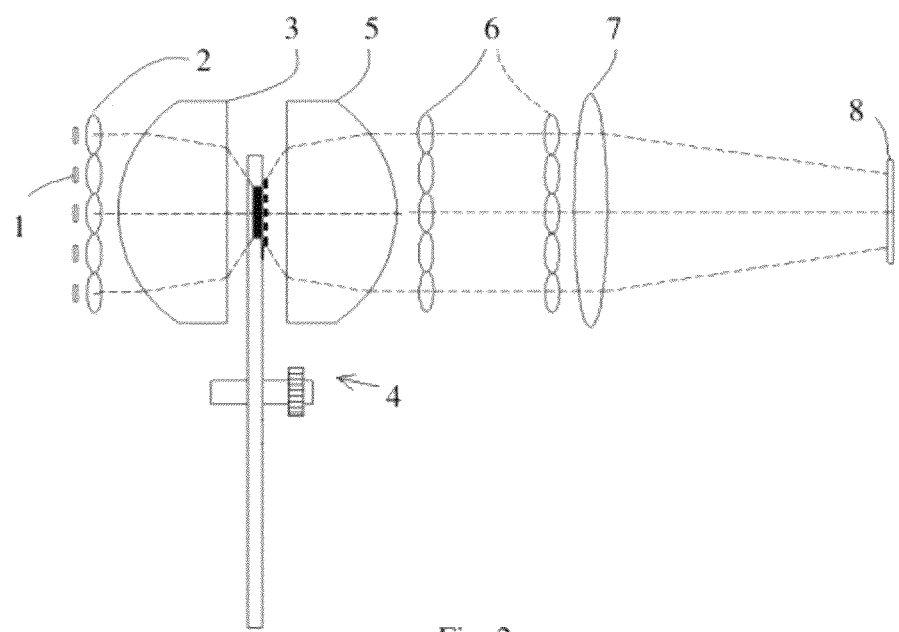
FIG. 2 illustrates a lighting device according to an embodiment of the present invention.
Figure 6:
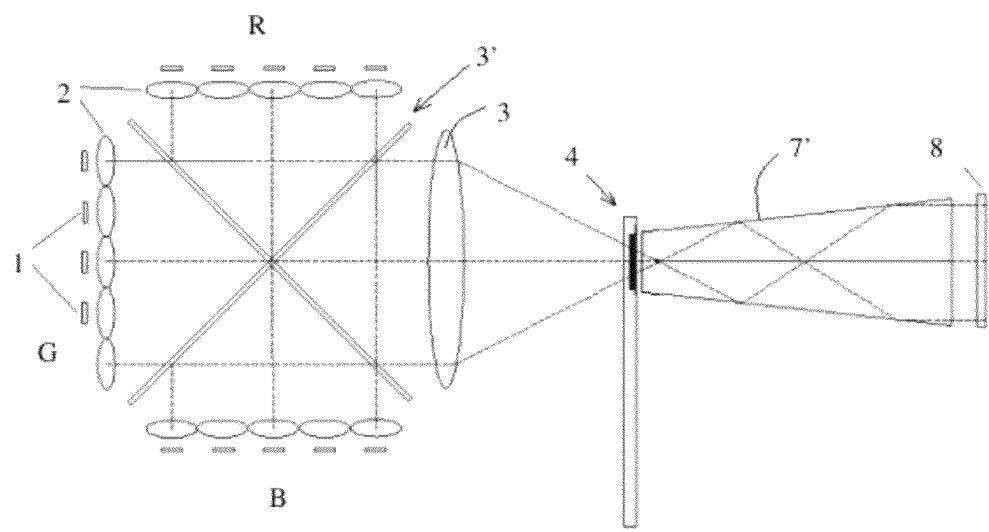
FIG. 6 illustrates a lighting device according to a second embodiment of the present invention.

Atypical lighting device includes a light source, a light output port where a pattern wheel or pattern plates may be disposed, and a light guiding device for guiding the light from the light source to the output port. As shown in FIG. 2, the light guiding device may use a focusing lens 7, which focuses the light from the light source to the output port 8. The light guiding device may also use a tapered light guiding rod 7', as shown in FIG. 6. The tapered light guiding rod may be a solid glass rod, or a hollow rod coated with high reflecting film or covered with reflective plates on the inner surface, to generate a uniform light spot with a relatively short optical path. In this embodiment, the light source uses a wavelength conversion scheme, and includes an excitation light source for generating an excitation light, and a moving unit. As shown in FIG. 2, the excitation light source may be a solid state light source, in particular, an array of multiple solid state light sources (such as but not limited to LED array 1), which can reduce cost and improve output power and brightness of the source. FIG. 2 also shows an array of multiple collimating lenses 2, each collimating lens being aligned with one LED to collimate the large angle light emitted by each LED into near parallel light with a small divergence angle. This improves the light utilization efficiency. A key component of this embodiment is the moving unit, which includes a wavelength conversion wheel assembly 4 shown in FIG. 2.

Figures 3, 3A, 3B:
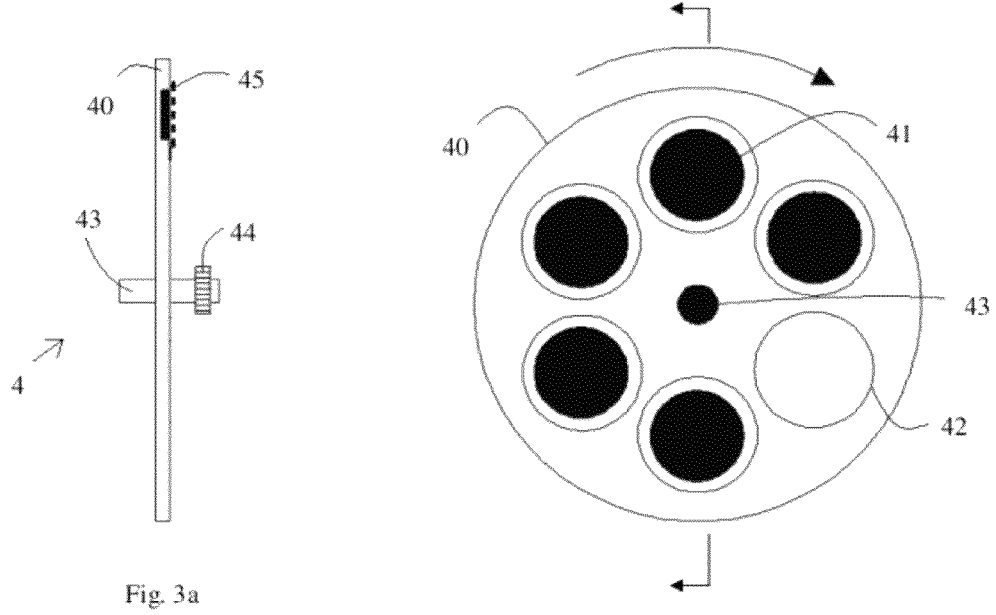
FIG. 3 illustrates a wavelength conversion wheel assembly according to an embodiment of the present invention.
FIG. 3a is a side view and FIG. 3b is a front view.

FIG. 3 illustrates the assembly 4 in more detail. The assembly includes a heat dissipating base 40, shown in the front view in FIG. 3b, which defines a number of segments for respectively carrying various wavelength conversion materials (e.g. segments 41) or carrying no wavelength conversion material (e.g. segment 42). It also includes a solid or hollow rotation shaft 43. The heat dissipating base is controlled to rotate intermittently or rotate to predefined angles around the rotation shaft. The number of segments is determined by the stage lighting requirements, and the number is typically three or more. For easy control, the segments should have similar or identical sizes, and their shapes may be circular (to match the shape of commonly used pattern plates), but are not limited thereto. The segments are distributed in a circular manner on the heat dissipating base. The wavelength conversion materials include phosphor, dye or quantum dots, which absorb the excitation light and emit converted light of various wavelengths different from the excitation wavelength. The wavelength conversion materials may be applied to the segments by coating, filling in, adhering, etc. The different wavelength conversion materials in the different segments may be different types of wavelength conversion materials which generate converted light of different colors under the same excitation light; or they may be the same wavelength conversion materials but having different concentrations or different layer thicknesses, or different mixtures of various amounts of two or more wavelength conversion materials, so that they generate lights of different color saturation or different color temperature under the same excitation light. To generate a light having the same color as the excitation light, a segment may be a transparent or reflective segment that carries no wavelength conversion material.

The heat dissipating base 40 may be formed of a transparent material, for example but not limited to two highly heat conductive glass plates clamped together, where the wavelength conversion materials are sandwiched between the two glass plates. The side view of FIG. 3a shows the presence of a filter film or filter plate 45, which is coated on or carried by the heat dissipating base 40, and aligned with at least one segment of the base. The heat dissipating base 40 may also be made of a nontransparent material, as shown in the side cross-sectional view of FIG. 4, where the heat dissipating base 40 has a number of heat dissipating plates with through holes, and each segment is disposed in a through hole. The wavelength conversion materials 46 are carried by transparent heat conducting plates 47 (such as heat conducting glass) nested in the through holes. Filter films or filter plates 45 may be additionally disposed in the through holes as shown in the figure. The heat dissipating plates may be provided with multiple blades (not shown) to increase the heat dissipating area. Based on the following relationship regarding the wavelength conversion material, $$E_{output} = E_{input} * \eta_{oc} * \eta_{stokes}$$

where $E_{output}$ is the energy of the converted light, $E_{input}$ is the energy of the input excitation light, $\eta_{oc}$ is the quantum efficiency (typically less than 1), and $\eta_{stokes}$ is the Stokes shift efficiency, i.e. the conversion efficiency of converting from one wavelength to another wavelength. When a blue light centered at 460 nm is converted to a light centered at 530 nm, $\eta_{stokes} = 460/530 = 0.87$. The longer the wavelength, the lower the conversion efficiency, and the lost light energy is converted to heat. Better heat conductivity of the heat dissipating base 40 and the heat conducting plates 47 helps increase the light conversion efficiency of the wavelength conversion material 46, and helps avoid burn out of the phosphor due to heat accumulation. Highly heat conductive transparent materials include but are not limited to sapphire.

The heat dissipating base 40 in the above two embodiments are suitable for transmission type optical arrangements. For a more compact design, reflection type optical arrangements may be used, where the heat dissipating base 40 is additionally provided with a reflective coating to reflect the converted light and the unabsorbed excitation light.

Figure 4:
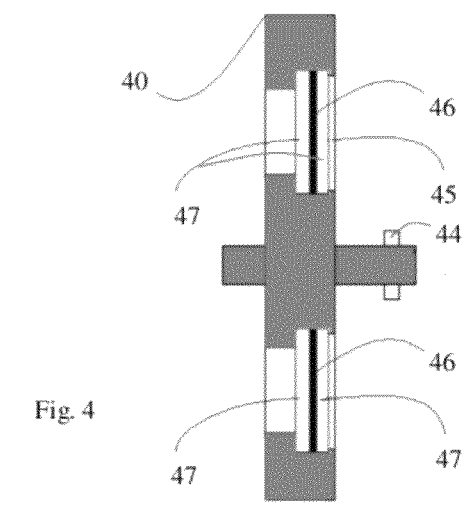
FIG. 4 illustrates a wavelength conversion wheel assembly according to an improved embodiment of the present invention, viewed in the direction indicated by the arrows in FIG. 3b.
Figure 5:
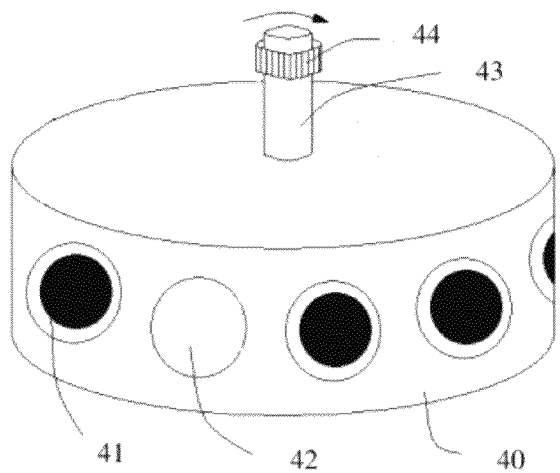
FIG. 5 illustrates a wavelength conversion wheel assembly according to an alternative embodiment of the present invention.

The wavelength conversion wheel assemblies shown in FIG. 3 and FIG. 4 have a generally plate shape or planar shape. As shown in FIG. 5, the assembly may also have the shape of a cylindrical surface, where the various segments 41, 42 are disposed on the cylindrical surface of the heat dissipating base 40. The cylindrical surface may be made of transparent or non transparent materials.

The rotation shaft 43 in FIGS. 3-5 can be used to mechanically support the wavelength conversion wheel assembly 4. The gear 44 disposed around the rotation shaft 43 is used to control the rotation of the wheel assembly to select the segment being illuminated by the excitation light. As an alternative, as will be recognized by those skilled in the art, the gear 44 may be disposed around the outer edge of the heat dissipating base 40, and the rotation shaft 43 may be replaced by other suitable components (for example but not limited to a bolt) to mount the heat dissipating base 40. Regardless of the specific mechanical structure, the heat dissipating base 40 has a rotation axis, and any suitable implementations are within the scope of this invention.

When the assembly 4 is used in a lighting device according to an embodiment of the present invention, as shown in FIG. 2, the heat dissipating base 40 faces the excitation light and a segment of it is illuminated. The area of illumination is equal to or smaller than the area of any of the segments. The lighting device additionally includes a control unit (not shown in the drawings) for controlling the rotation of the wavelength conversion wheel assembly so that a selected one of the segments of the heat dissipating base 40 is in the optical path of the excitation light to generate desired output light.

In a preferred embodiment, to increase conversion efficiency of the phosphor material, the lighting device further includes a second focusing lens 3 which focuses the near parallel light having a relatively large area onto a smaller area of the heat dissipating base 40 where wavelength conversion materials are carried. This reduces the etendue of the optical system. The second focusing lens 3 may be made of a glass or plastic material and may be a spherical lens or an aspheric lens.

Considering that the converted light from the phosphor material has a Lambertian distribution, i.e., the converted light is emitted by the phosphor material at a 180 degree full width distribution, a second collimating lens 5 may be disposed between the heat dissipating base 40 and the focusing lens 7. The light collection angle of the second collimating lens 5 is preferably greater than 120 degrees in full width, to collimate the large angle light emitted by the phosphor and direct it to the focusing lens 7. An integral lens set 6 is disposed between the second collimating lens 5 and the focusing lens 7 to make the output light spot more uniform in brightness and/or color. A disadvantage of using the integral lens set 6 is that it increases the length of the optical system. These optical components are well known in relevant art and are not described in detail here. It should be noted that except for the moving unit 4, other components of the system shown in FIG. 2 may be replaced by alternative components. For example, in lieu of the focusing lens 7 and the second collimating lens 5, the light guiding device may use an optical fiber having a suitably large aperture. If a light collecting assembly is used near the heat dissipating base 40 to reduce the size of the output light, an optical fiber having a smaller aperture may be used for this purpose. In addition, if the light source does not need to be controlled in real time, the excitation light source may use conventional monochromatic light sources such as UV light in lieu of solid state light sources such as LED or laser diode.

If the wavelength conversion wheel assembly 4 is not provided with a filter plate of filter film on the surface facing the light guiding device, then the lighting device may be provided with an additional wheel carrying a filter plate having a similar size as the segments of the wavelength conversion wheel assembly. The control unit controls the movement of this additional wheel to move the filter plate in and out of the optical path between the heat dissipating base 40 and the light guiding device.

Using the above described lighting device, a method according to an embodiment of the present invention for tuning the color of the output light is summarized below:

Providing a moving unit, including the wavelength conversion wheel assembly 4;

Providing or operating a control unit to control the moving unit, wherein the wavelength conversion wheel assembly moves such that a selected segment of the wavelength conversion wheel assembly is disposed in the illumination path of the excitation light; and Generating an output light of a selected color, wherein the color of the output light is jointly determined by the excitation light source and the selected segment or the wavelength conversion material carried by the selected segment.

More specifically, the method includes the following steps, using as an example a blue LED array as the excitation light source, a phosphor as the wavelength conversion material, and transmission type segments on the wavelength conversion wheel assembly. When a segment carrying a yellow phosphor is controlled to enter the optical path of the excitation light, the output light is white as a result of the blue excitation light mixing with the yellow converted light. When the heat dissipating base uses a transparent material, or the segments are nested in through holes of the heat dissipating base, the method may further include a step of providing a filter plate or filter film on or adjacent the heat dissipating base on the side facing the light guiding device, for selectively transmitting light of a predetermined wavelength range or predetermined output angle range. For example, a blue-blocking filter may be provided between the heat dissipating base and the light guiding device to filter out blue light. When such a filter is provided, if a yellow phosphor segment of the heat dissipating base is in the optical path, then the output light will be a yellow light; if a red phosphor segment is in the optical path, then the output light will be a red light; and if a green phosphor segment is in the optical path, then the output light will be a green light; etc. Likewise, when the excitation light source is a UV LED and a UV-blocking filter is used, similar results can be obtained. When the filter plate or filter film is one that can selectively transmit light of a certain range of output angles, the divergence angle of the output light can be improved, and a low divergence output light can be obtained, which may eliminate the need for the second collimating lens 5. Further, because a part of the converted light generated by the wavelength conversion wheel assembly will travel toward the excitation light source, to effectively output the converted light, a wavelength selection filter film or filter plate may be provided on the heat dissipating base 40 or the heat conducting plate 47 on the side facing the excitation light. The wavelength selection filter reflects the converted light and transmits the excitation light, thereby effectively outputting the converted light, increasing the utilization rate of the converted light and the brightness of the lighting device. Because the wavelength range of the excitation light is shorter than that of the converted light, the wavelength selection filter may be a low pass optical filter which transmits shorter wavelength light and reflects longer wavelength light.

The method according to embodiment of the present invention further includes a step of using a control unit for controlling the excitation light source and the moving unit in a synchronized manner. For example, when the control unit controls the wavelength conversion wheel assembly 4 to move, it simultaneously cuts off the drive power to the excitation light source; when the wavelength conversion wheel assembly stops moving, the control unit turns on the drive power to the excitation light source. This generates a converted light having a discontinuous color changing effect.

To generate output light with repeating or programmed color change, a manual or predetermined color changing pattern can be provided; thus, by operating the control units at predetermined times or intermittently, the wheel segments or filters can be selected in a desired manner. The control unit may include a stepping motor to drive a gear set to move the wavelength conversion wheel assembly. Digital technology may be used to control the above operations of the control unit; such control can be readily implemented by those skilled in the relevant art and are not described in detail here.

In the device and method according to embodiments of the present invention, in addition to using the various segments of the wavelength conversion wheel assembly to change the color or color temperature of the output light, different excitation light sources may be used in combination with the different segments to adjust the color or color temperature of the output light. For example, in the above described examples, the excitation light source is a monochromatic source; but the excitation light source may also include LEDs or LED arrays that emit lights of two or more colors. For example, a small number of red LEDs may be added to a blue LED array; when a yellow phosphor is used, then the output white light will have a reddish color. Alternatively, to obtain a more uniform light distribution, the red LEDs may be formed into a separate array, as shown in FIG. 6, and the red light and blue light may be combined by a light combining unit 3' into the excitation light beam. Details of other examples are omitted.

What is claimed is:

1. A wavelength conversion wheel assembly, comprising:
   a heat dissipating base having a plurality of segments, at least two segments each carrying a wavelength conversion material, the at least two segments being spatially separated and not contacting each other, wherein the heat dissipating base includes a heat dissipating plate having a plurality of through holes, wherein each segment is disposed in a through hole, each segment including a transparent heat conducting plate disposed in the through holes for carrying the wavelength conversion material;
a mounting device for supporting the heat dissipating base to rotate around a rotation axis, wherein the heat dissipating base is controlled to rotate intermittently or to predetermined angles.

2. The wavelength conversion wheel assembly of claim 1, wherein the plurality of segments have substantially identical sizes, have a circular shape, and are distributed in a circular manner on the heat dissipating base.

3. The wavelength conversion wheel assembly of claim 1, wherein the heat dissipating base has a plate shape or a cylindrical shape.

4. The wavelength conversion wheel assembly of claim 1, wherein the wavelength conversion materials include phosphor, dye or quantum dots.

5. The wavelength conversion wheel assembly of claim 1, wherein the heat dissipating base is made of a transparent material.

6. The wavelength conversion wheel assembly of claim 5, wherein the heat dissipating base includes two heat conductive glass plates clamped together, and wherein the wavelength conversion materials are sandwiched between the two heat conductive glass plates.

7. The wavelength conversion wheel assembly of claim 1, wherein at least one of segments of the heat dissipating base further includes a filter.

8. The wavelength conversion wheel assembly of claim 1, further comprising:
a gear disposed on a rotating shaft of the heat dissipating base or at an edge of the heat dissipating base.

9. A lighting device, comprising:
a light source;
a light output port;
a light guiding device for guiding the light from the light source to the light output port;
wherein the light source includes:
an excitation light source for providing an excitation light; and
a moving unit, wherein the moving unit includes a wavelength conversion wheel assembly which includes: a heat dissipating base having a plurality of segments, at least two segments each carrying a wavelength conversion material, the at least two segments being spatially separated and not contacting each other, and a mounting device for supporting the heat dissipating base to rotate around a rotation axis, wherein the heat dissipating base is controlled to rotate intermittently or to predetermined angles, wherein the heat dissipating base faces the excitation light and is partially illuminated by the excitation light, wherein an area of illumination is no greater than an area of any one of the segments;
a filter plate having a size substantially identical to a size of the plurality of segments of the heat dissipating base;
a second wheel carrying the filter plate; and
a control unit for controlling a movement of the wavelength conversion wheel assembly so that a selected one of the plurality of segments of the heat dissipating base is illuminated by the excitation light to generate an output light,
wherein the control unit controls a movement of the second wheel to move the filter plate in and out of an optical path between the heat dissipating base and the light guiding device.

10. The lighting device of claim 9,
wherein the excitation light source includes an array of a plurality of light emitting diodes (LED), and
wherein the lighting device further comprises an array of a plurality of collimating lenses, each collimating lens being aligned with an LED to collimate a light emitted by the LED into near parallel light.

11. The lighting device of claim 9, wherein the light guiding device includes a focusing lens for focusing the light from the light source to the light output port.

12. The lighting device of claim 9, further comprising a second focusing lens for focusing the excitation light onto the wavelength conversion material on the heat dissipating base.

13. The lighting device of claim 11, further comprising a second collimating lens disposed between the heat dissipating base and the focusing lens for collimating the light from the light source into a near parallel light to be focused by the focusing lens.

14. The lighting device of claim 13, further comprising an integral lens set disposed between the second collimating lens and the focusing lens.

15. The lighting device of claim 9, wherein the heat dissipating base of the wavelength conversion wheel assembly includes at least one segment that carries a wavelength conversion material, the heat dissipating base further comprising a wavelength selection filter disposed in the at least one segment on a side facing the excitation light.

16. The lighting device of claim 9, further comprising a pattern wheel carrying pattern plates aligned with the light output port.

17. A color tuning method for a lighting device, wherein the lighting device comprises a light source, a light output port, and a light guiding device for guiding the light from the light source to the output port, wherein the light source includes an excitation light source for providing an excitation light, the method comprising:
providing a moving unit, wherein the moving unit includes a wavelength conversion wheel assembly which includes: a heat dissipating base having a plurality of segments, at least two segments each carrying a wavelength conversion material, the at least two segments being spatially separated and not contacting each other, and a mounting device for supporting the heat dissipating base to rotate around a rotation axis, wherein the heat dissipating base is controlled to rotate intermittently or to predetermined angles, wherein the heat dissipating base faces the excitation light and is partially illuminated by the excitation light, wherein an area of illumination is no greater than an area of any one of the segments;
operating a control unit to control the wavelength conversion wheel assembly, wherein the wavelength conversion wheel assembly moves so that a selected one of the plurality of segments is disposed in an illumination path of the excitation light;
generating an output light of a selected color, wherein the color of the output light is determined by the excitation light source and the selected segment or the wavelength conversion material carried by the selected segment; and
operating the control unit to control the excitation light and the moving unit in a synchronized manner.

18. The color tuning method of claim 17, wherein the excitation light source includes an array of a plurality of light emitting diodes (LED) and an array of a plurality of collimating lenses, each collimating lens being aligned with an LED to collimate a light emitted by the LED into near parallel light.

19. The color tuning method of claim 18, wherein the LEDs are blue LEDs.

20. The color tuning method of claim 17, wherein the heat dissipating base is made of a transparent material or have a plurality of through holes in which the segments are disposed, the method further comprising:
providing a filter on or near the heat dissipating base on a side facing the light guiding device, wherein the filter is disposed in an optical path between the heat dissipating base and the light guiding device for selectively transmitting light of a predetermined wavelength range or predetermined output angle range.

21. The color tuning method of claim 17, further comprising:
forming a wavelength selection filter on the heat dissipating base on a side facing the excitation light for reflecting the converted light.

22. The color tuning method of claim 17, wherein the operating step includes operating the control unit at predetermined times or intermittently according to a predetermined color changing pattern to select the segments.

23. The color tuning method of claim 17, wherein the control unit includes a stepping motor for driving the wavelength conversion wheel assembly via gears.

* * * * *